US012600596B2

(12) United States Patent
Carpenter, Jr. et al.

(10) Patent No.: US 12,600,596 B2
(45) Date of Patent: Apr. 14, 2026

(54) MULTI-FUNCTION SYSTEM FOR HANDLING FIBER OPTIC CABLE REELS AT AN INSTALLATION SITE AND METHOD OF USING SAME

(71) Applicants:CORNING RESEARCH & DEVELOPMENT CORPORATION, Corning, NY (US); Kenneth Franklin Carpenter, Jr., Lincolnton, NC (US)

(72) Inventors: Kenneth Franklin Carpenter, Jr., Lincolnton, NC (US); Michael Davis Richardson, Charlotte, NC (US); Joshua Thomas Smith, Mooresville, NC (US); Charles Gregory Stroup, Jr., Lincolnton, NC (US)

( * ) Notice: Subject to any disclaimer, the term of this patent is extended or adjusted under 35 U.S.C. 154(b) by 78 days.

(21) Appl. No.: 18/594,519

(22) Filed: Mar. 4, 2024

(65) Prior Publication Data

US 2024/0300775 A1     Sep. 12, 2024

Related U.S. Application Data

(60) Provisional application No. 63/451,065, filed on Mar. 9, 2023.

(51) Int. Cl.
B65H 49/24         (2006.01)
G02B 6/44          (2006.01)

(52) U.S. Cl.
CPC ........... B65H 49/24 (2013.01); G02B 6/4457 (2013.01); B65H 2701/32 (2013.01)

(58) Field of Classification Search
CPC ........ B65H 49/24; B65H 49/32; B65H 49/38; B65H 49/325; B65H 2701/32
See application file for complete search history.

(56) References Cited

U.S. PATENT DOCUMENTS

| | | | |
|---|---|---|---|
| 2,904,273 | A | 9/1959 | Turner, Jr. et al. |
| 3,103,322 | A | 9/1963 | Garner |
| 4,447,012 | A | 5/1984 | Woodruff |
| 4,762,291 | A | 8/1988 | Sauber |
| 4,945,938 | A | 8/1990 | Ponsford et al. |
| 5,538,170 | A | 7/1996 | Van Luit |
| 5,820,330 | A | 10/1998 | Focke et al. |
| 6,494,397 | B1 | 12/2002 | Myklebust |
| 8,398,013 | B2 | 3/2013 | Skalleberg |
| 9,079,745 | B2 * | 7/2015 | Galindo Gonzalez ...................... B65H 75/185 |
| 9,555,925 | B2 | 1/2017 | Marchek et al. |
| 10,301,149 | B2 * | 5/2019 | Franklin-Hensler ... B65H 59/04 |
| 10,696,511 | B2 | 6/2020 | Kobayashi et al. |
| 10,730,719 | B2 | 8/2020 | Franklin-Hensler et al. |

(Continued)

*Primary Examiner* — Sang K Kim
(74) *Attorney, Agent, or Firm* — Adam R. Weeks

(57)         ABSTRACT

A multi-function handling system for use with a fiber optic cable reel at an installation site includes a base body and a roller assembly connected to the base body to support the fiber optic cable reel of the base body. The base body includes a connection interface for engaging with pallet handling equipment to move the handling system around the installation site. The roller assembly includes a plurality of rollers configured to allow the fiber optic cable reel to rotate relative to the base body to payoff a length of fiber optic cable on the fiber optic cable reel for installation at the installation site. A method of handling a fiber optic cable reel at an installation site is also disclosed.

16 Claims, 12 Drawing Sheets

(56)           References Cited

U.S. PATENT DOCUMENTS

| | | | |
|---|---|---|---|
| 10,759,627 B2 | 9/2020 | Grabowski et al. | |
| 11,084,685 B2 | 8/2021 | Matari et al. | |
| 11,767,192 B2 * | 9/2023 | Franklin-Hensler | ......................... B65H 75/425 |
| | | | 242/393 |
| 2021/0171312 A1 | 6/2021 | Morrison | |

* cited by examiner

MULTI-FUNCTION SYSTEM FOR HANDLING FIBER OPTIC CABLE REELS AT AN INSTALLATION SITE AND METHOD OF USING SAME

PRIORITY APPLICATION

This application claims the benefit of priority of U.S. Provisional Application No. 63/451,065, filed on Mar. 9, 2023, the content of which is relied upon and incorporated herein by reference in its entirety.

TECHNICAL FIELD

This disclosure relates generally to fiber optic cables, and more particularly to an integrated, multi-function system for a fiber optic cable reel that facilitates improved handling of the cable reel at an installation site. The disclosure also relates to an improved method of handling the cable reel at the installation site using the integrated, multi-function system.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of racks or cabinets (e.g., twenty racks or cabinets) which hold the network equipment. In some data center architectures, each of the rows includes a main patch panel, which may be at a front or head end of the row. Distribution cables with relatively large number of optical fibers (high fiber counts) are routed from a building distribution frame (sometimes referred to as a main distribution frame) to the patch panels for the different rows of equipment racks. At the patch panels, a large number of distribution fiber optic cables with lower fiber counts are connected to the optical fibers of the associated high fiber count distribution cable(s) and routed along the row to connect to the network equipment held in the various racks in the row.

During construction of the data center, large amounts of fiber optic cable are transported to the data center on large spools or reels with each holding a typically continuous supply of fiber optic cable wrapped about the reel (referred to hereafter as a "fiber optic cable reel" or "cable reel"). The coiled or wrapped configuration of the fiber optic cable is an efficient arrangement to store and transport long lengths of cable and further provides an advantageous arrangement of the cable for installation purposes. Thus, cable reels are the standard manufacturing configuration for fiber optic cables in the industry, especially for large-diameter fiber optic cables, such as exterior trunk cables and interior distribution cables. In many cases, the loaded cable reels may be sized (e.g., weight limits between about 60 kg to about 7,000 kg) so as to be moved through standard shipping modes, such as less than truckload (LTL) carrier networks. As such, at the manufacturing facility, the loaded cable reels are placed on and secured to pallets (e.g., standard wood pallets) for shipment to an installation site. The cable reels and pallets are then loaded onto carrier trucks or other vehicles for transport to the installation site, such as at a data center or the like.

FIG. 1 illustrates a conventional process flow 10 for handling cable reels at the installation site. At step 12, upon arrival of the carrier truck at the installation site, the cable reels and pallets are removed from the carrier truck and may optionally be moved to a storage area at the installation site, as indicated at step 14. This movement of the cable reels and pallets may be through conventional pallet handling equipment, such as forklifts or pallet jacks, which are typically available at the installation site. When it comes time for the fiber optic cable on a cable reel to be installed at the installation site, a cable reel and pallet are moved to a deployment staging location, as indicated in step 16, and the cable reel is removed from the pallet, as indicated in step 18. In this step, specialized lifting equipment, i.e., beyond a forklift or pallet jack, is used to move the heavy, fully-loaded cable reel off the pallet. Such specialized lifting equipment is not typically available at the installation site and must be rented and supplied to the installation site for this specific purpose, which comes at an additional cost. The use of costly specialized equipment in the process is denoted by symbol 20 in FIG. 1. Due to the large weight of the loaded cable reel being at least slightly airborne, step 18 may present some safety concerns for the personnel facilitating the removal of the cable reel from the pallet. These safety concerns are denoted by symbol 22 in FIG. 1.

Once removed from the pallet, and as indicated in step 24, the cable reel is moved to a desired location at the installation site for routing the fiber optic cable along a cable tray, duct, or other cable pathway (generally referred hereafter as "cable pathways"). By way of example, in large scale data centers, the cable reel may be moved to a data hall for installation of the fiber optic cable. In many cases, the movement of the cable reel at the installation site may be by manual means, such as by rolling the cable reel along or through various hallways, corridors, and doorways to reach the installation location for routing the fiber optic cable. There may be some safety concerns 22 associated with this step as well. Additionally, control over such a heavy load is a concern to avoid damage to the data center itself and/or to the expensive network equipment therein.

To facilitate installation, as indicated in step 26, the cable reel may be loaded into specialized dispensing equipment that facilitates the payoff of the fiber optic cable from the cable reel. Such specialized dispensing equipment is also not readily available at the installation site and must be rented and supplied at an additional cost, as denoted at 20. For example, the specialized dispensing equipment may include a floor roller assembly or a jack stand having an axle bar about which the cable reel can rotate to payoff the fiber optic cable wound thereon. In step 28, technicians at the installation site may then payoff the fiber optic cable from the dispensing equipment device and install the fiber optic cable along desired cable pathways.

When the supply of fiber optic cable on the cable reel has been depleted, the cable reel is removed from the dispensing equipment, as indicated in step 30, and is moved to a shipping staging location, as indicated in step 32, for return of the cable reel to the manufacturing facility. Similar to the above, the movement of the cable reel from the installation location to the shipping staging location may be by manual means, such as by rolling. Similar to the above, this step may include safety concerns 22 and control concerns. In step 34, the cable reel is loaded back onto a pallet (e.g., the same or different pallet) using the specialized lifting equipment (not normally on location, as denoted by 20) to move the cable reel onto the pallet. The cable reel is then secured to the pallet by, for example, re-banding or through the use of retention straps. Similar to the above, due to the weight of the cable reel (which remains heavy even when empty), this step may present some safety concerns 22 for the personnel facilitating the placement of the cable reel onto the pallet. From here, the now empty cable reel and pallet may be moved to a loading location in step 36. In step 38, upon the arrival of a LTL carrier truck at the installation site, the cable reel and pallet may be loaded onto the carrier truck for shipment back to the manufacturing facility. The movement of the cable reel and pallet in steps 36 and 38 may be by way of conventional pallet handling equipment maintained onsite.

While the process flow 10 described above operates for its intended purpose, the process has many drawbacks which manufacturers, installers, etc. desire to improve upon. For example, it is clear from FIG. 1 above that the cable reel is handled in numerous ways at the installation site, including forklifts/pallet jacks for unload/load purposes related to carrier vehicles, specialized lifting equipment for unloading/loading of the cable reel from/to the pallet, manual handling to move the cable reel to/from the cable installation location, and specialized dispensing equipment to payoff the fiber optic cable on the cable reels during installation. There is, however, some logic to the numerous handling means of the cable reels at the installation site.

For example, standard wood pallets used during transport of the cable reels through the carrier network allow conventional pallet handling equipment to be used to interface with the cable reel disposed thereon and move the pallet/cable reel around at the installation site. However, wood pallets typically used in transport are generally not allowed in the interior of data centers and other sensitive environments, where the presence of dirt and other air-borne debris can cause a disruption to the network equipment that operates in the data center. Accordingly, the cable reels must be removed from the wood pallets before entering the data center, which necessitates the use of the specialized lifting equipment to unload/load the cable reel from/to the pallet. Moreover, because the cable reels are no longer associated with the wood pallets, the use of conventional pallet handling equipment to move the cable reels is no longer possible. Furthermore, manufacturers typically find locating electrical equipment near the expensive and sensitive network equipment in the data halls highly undesirable. Thus, the use of electric pallet handling equipment (e.g., forklifts) in the interior of the data center is generally prohibited. For these reasons, manual means are typically used to move cable reels around within the interior of the data center (e.g., rolling the cable reels down hallways and corridors and through doorways). Lastly, once the cable reel is located at the desired installation location in the data center, equipment is needed to facilitate the payoff of the fiber optic cable during installation. This necessitates the specialized (non-powered) dispensing equipment described above.

There are also other drawbacks to the conventional process illustrated in FIG. 1. For example, once the cable reels are removed from the wood pallets, the pallets have to be stored at the installation site for reuse when sending the (empty) cable reels back to the manufacturing facility. The storage of the pallets can take up appreciable space in or around the shipping area of the installation site (e.g., loading dock). Additionally, because pallets are universal shipping items (i.e., used to ship a broad range of products) and are relatively low cost, very little care is taken in storing and maintaining pallets properly. Thus, when it comes time to send an empty cable reel back to the manufacturing facility, the corresponding pallet is often missing or damaged, which may necessitate the purchase of replacement pallets at an additional cost. Furthermore, when sending an empty cable reel back to the manufacturing facility, the cable reel must be secured to the pallet. This is generally accomplished with re-banding the cable reel to the pallet, which is expensive, or using separate retention straps. In many cases, when it comes time to send an empty cable reel back to the manufacturing facility, the retention straps are misplaced or lost. The manufacturer must then send another set of retention straps to the installation site, which increases costs and is time consuming.

In view of the above, manufacturers seek more efficient devices and methods for handling fiber optic cable reels at the installation site.

SUMMARY

In one aspect of the disclosure, a handling system for use with a fiber optic cable reel at an installation site is disclosed. The handling system includes a base body configured to support the fiber optic cable reel thereon and a first roller assembly connected to the base body and configured to engage with and vertically support the fiber optic cable reel when mounted on the base body. The base body includes a connection interface for engaging with pallet handling equipment to move the handling system around the installation site. The first roller assembly includes a plurality of first rollers configured to allow the fiber optic cable reel to rotate relative to the base body to payoff a length of fiber optic cable carried by the fiber optic cable reel for installation along a cable pathway at the installation site.

In one embodiment, the connection interface in the base body may include a plurality of engagement slots, such as a pair of generally parallel engagement slots, configured to engage with one or more tongs of the pallet handling equipment. Such pallet handling equipment may include conventional pallet handling equipment normally maintained at an installation site, such as, for example, forklifts, pallet jacks, or other pallet handling equipment known in the industry. The pallet handling equipment may be used to raise, lower, and otherwise move the fiber optic cable reel, via the handling system, around the installation site.

In one embodiment, the first roller assembly may include a plurality of roller blocks connected to the base body. Each of the plurality of roller blocks may include a roller housing and a respective one of the plurality of first rollers disposed in the roller housing. In one embodiment, each of the plurality of first rollers may include a central axle and the roller blocks may be arranged relative to the base body such that the central axles of the plurality of first rollers are generally parallel to each other. In one embodiment, the first roller assembly may be fixedly connected to the base body such that the base body is configured to accommodate only one size of fiber optic cable reel thereon. In an alternative embodiment, however, the first roller assembly may be adjustably connected to the base body to accommodate fiber optic cable reels of different sizes. In a further embodiment, the first roller assembly may include a brake to restrict the rotation of at least one of the plurality of first rollers relative to the base body. This prevents undesired movements of the fiber optic cable reel relative to the base body and facilitates control over the fiber optic cable reel during movements at the installation site.

In one embodiment, the handling system may include a second roller assembly connected to the base body and configured to engage with and horizontally support the fiber optic reel when mounted on the base body. The second roller assembly may include a plurality of second rollers to guide the rotation of the fiber optic cable reel relative to the base body. In one embodiment, the second roller assembly may include a plurality of roller elements connected to the base body, and each of the plurality of roller elements may include a respective one of the plurality of second rollers and a central axle about which the respective one of the plurality of second rollers rotates. In one embodiment, the plurality of roller elements may be arranged relative to the base body such that the central axles of the plurality of second rollers are generally parallel to each other. The central axles of the plurality of second rollers may also be generally perpendicular to the central axles of the plurality of first rollers. In one embodiment, the second roller assembly may be fixedly connected to the base body such that the base body is configured to accommodate only one size of fiber optic cable reel thereon. In an alternative embodiment, however, the second roller assembly may be adjustably connected to the base body to accommodate fiber optic cable reels of different sizes.

In one embodiment, the base body may be formed from a non-particulate material, and may preferably formed from steel, plastic, or combinations thereof. This material selection allows the handling system to be used in areas of the installation site that are sensitive to dirt, debris, and other airborne particulate (e.g., a data hall of a data center). In another embodiment, the handling system may further include a plurality of base anchors connected to the base body. In this embodiment, the plurality of base anchors may be configured to facilitate securement of the fiber optic cable reel to the base body, such as during transport of the cable reel to/from the installation site in the carrier vehicle. For example, reusable retention straps may be used with the base anchors to secure the cable reel to the base body. In still a further embodiment, the base body of the handling system may include a storage cavity for storing items related to the handling system, such as the reusable retention straps.

In another aspect of the disclosure, a cable reel assembly is disclosed. The cable reel assembly includes a fiber optic cable reel and the handling system according to the first aspect of the disclosure described above, wherein the fiber optic cable reel is mounted on the handling system. In one embodiment, the cable reel assembly may further include a plurality of reusable retention straps for selectively securing the fiber optic cable reel to the handling system. As noted above, the retention straps may be used during transport of the cable reel assembly to/from the installation site. Moreover, when the retention straps are not in use, they may be placed in the storage cavity in the base body to avoid misplacing or losing the straps.

In a further aspect of the disclosure, a method of handling a fiber optic cable reel at an installation site is disclosed. The fiber optic cable reel forms part of a cable reel assembly that includes a handling system and the fiber optic cable reel mounted on the handling system. The method includes moving the cable reel assembly to an installation location at the installation site using pallet handling equipment, the fiber optic cable reel having a supply of fiber optic cable thereon, and rotating the fiber optic cable reel relative to the handling system to payoff a length of fiber optic cable on the fiber optic cable reel for installation along a cable pathway at the installation site.

In one embodiment, the method may further include unloading the cable reel assembly from a carrier vehicle using the pallet handling equipment and optionally moving the cable reel assembly to a storage location at the installation site using the pallet handling equipment. In one embodiment, the handling system may include a connection interface configured as a plurality of engagement slots and moving the cable reel assembly using the pallet handling equipment may include respectively engaging one or more tongs of the pallet handling equipment with one or more of the plurality of engagement slots on the handling system. In this way, the cable reel assembly may be moved around the installation site using the pallet handling system.

In one embodiment, rotating the fiber optic reel relative the handling system may include supporting the fiber optic cable reel on the handling system using a first roller assembly for vertically supporting the fiber optic reel on the handling system. The first roller assembly may include a plurality of first rollers to allow the fiber optic cable reel to rotate relative to the handling system. In one embodiment, the method may include adjusting the first roller assembly to accommodate the size of the fiber optic cable reel being supported on the handling system. Additionally, in one embodiment, the first roller assembly may include a brake to restrict the rotation of at least one of the plurality of first rollers and the method may further include engaging the brake during movements of the cable reel assembly about the installation site and releasing the brake during rotations of the fiber optic cable reel relative to the handling system.

In one embodiment, rotating the fiber optic reel relative the handling system may include supporting the fiber optic cable reel on the handling system using a second roller assembly for horizontally supporting the fiber optic reel on the handling system. The second roller assembly may include a plurality of second rollers to guide the rotation of the fiber optic cable reel relative to the handling system. In one embodiment, the method may include adjusting the position of one or more of the plurality of second rollers to accommodate the size of the fiber optic cable reel being supported on the handling system.

In one embodiment, when the fiber optic cable reel is depleted of its supply of fiber optic cable, the method may further include moving the cable reel assembly to a shipping location using the pallet handling equipment and securing the fiber optic cable reel to the handling system, such as with the reusable retention straps that are stored in the handling system. In one embodiment, the method may further include loading the cable reel assembly onto a carrier vehicle using the pallet handling equipment.

Additional features and advantages will be set forth in the detailed description which follows, and in part will be readily apparent to those skilled in the technical field of fiber optic installation and connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a handling system for use with a fiber optic cable reel at an installation site. The handling system is an integrated, multi-functional device that improves how fiber optic cable reels mounted on the handling system are handled at an installation site. In particular, the handling system includes a connection interface for engaging with conventional pallet handling equipment, such as forklifts and pallet jacks, which are typically available at most installation sites. Thus, for example, the handling system performs the function of conventional wood pallets as described above. The handling system, however, is made of a non-particulate material that allows the handling system to be used in debris-sensitive environments, such as in a data hall of a data center. This, in turn, allows a pallet jack, for example, to be used to move the fiber optic cable reel around at the installation site, as opposed to manual means in the conventional process. Thus, handling and control of the cable reel during its movement around the installation site are greatly improved. This also improves safety concerns for technicians and installers handling the fiber optic cable reel at the installation site.

Additionally, the handling system includes a roller assembly that allows the fiber optic cable reel to selectively rotate relative to the handling system. Thus, fiber optic cable carried by the cable reel may be paid off the reel during installation of the fiber optic cable at the installation site. In this way, separate specialized dispensing equipment does not have to be provided to the installation site to facilitate installation of the fiber optic cable. Additionally, since the handling system performs a pallet function and a dispensing function, the fiber optic cable reel may remain connected to the handling system during its use at the installation site. Accordingly, separate specialized lifting equipment and safety issues related to removing the cable reel from the pallet (i.e., before use) and placing the cable reel on the pallet (after use), as described above, are avoided.

Figure 2:
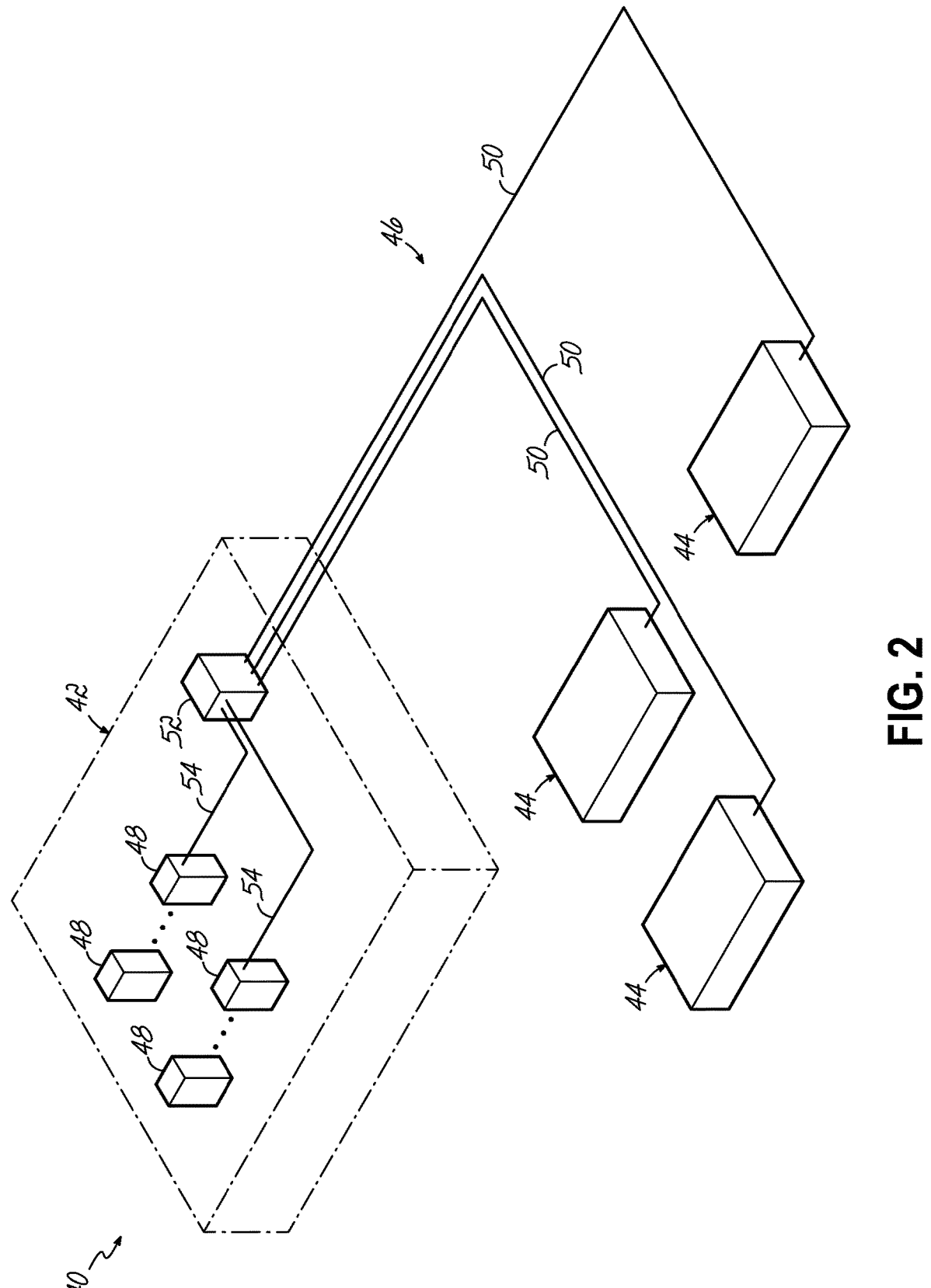
FIG. 2 is a schematic illustration of a data center campus according to an exemplary embodiment of the disclosure.

As illustrated in FIG. 2, a modern-day data center 40 may include a collection of buildings (referred to as a data center campus) having, for example, a main building 42 and one or more auxiliary buildings 44 in close proximity to the main building 42. While three auxiliary buildings are shown, there may be more or less depending on the size of the campus. The data center 40 provides for a local fiber optic network 46 that interconnects the auxiliary buildings 44 with the main building 42. The local fiber optic network 46 allows network equipment 48 in the main building 42 to communicate with various network equipment (not shown) in the auxiliary buildings 44. In the exemplary embodiment shown, the local fiber optic network 46 includes trunk cables 50 extending between the main building 42 and each of the auxiliary buildings 44. Conventional trunk cables 50 generally include a high fiber-count arrangement of optical fibers for passing data and other information through the local fiber optic network 46. In the example illustrated in FIG. 2, the trunk cables 50 from the auxiliary buildings 44 are routed to one or more distribution cabinets 52 housed in the main building 42 (one shown).

Within the main building 42, a plurality of indoor fiber optic cables 54 ("indoor cables 54") are routed between the network equipment 48 and the one or more distribution cabinets 52. The indoor cables 54 generally include a high fiber-count arrangement of optical fibers for passing data and other information from the distribution cabinets 52 to the network equipment 48. Although only the interior of the main building 42 is schematically shown in FIG. 2 and discussed above, each of the auxiliary buildings 44 may house similar equipment for similar purposes. Thus, although not shown, each of the trunk cables 50 may be routed to one or more distribution cabinets 52 in one of the auxiliary buildings 44 in a manner similar to that described above. Furthermore, each of the auxiliary buildings 44 may include indoor cables 54 that extend between network equipment 48 and the one or more distribution cabinets 52 of the auxiliary building 44.

Figure 3:
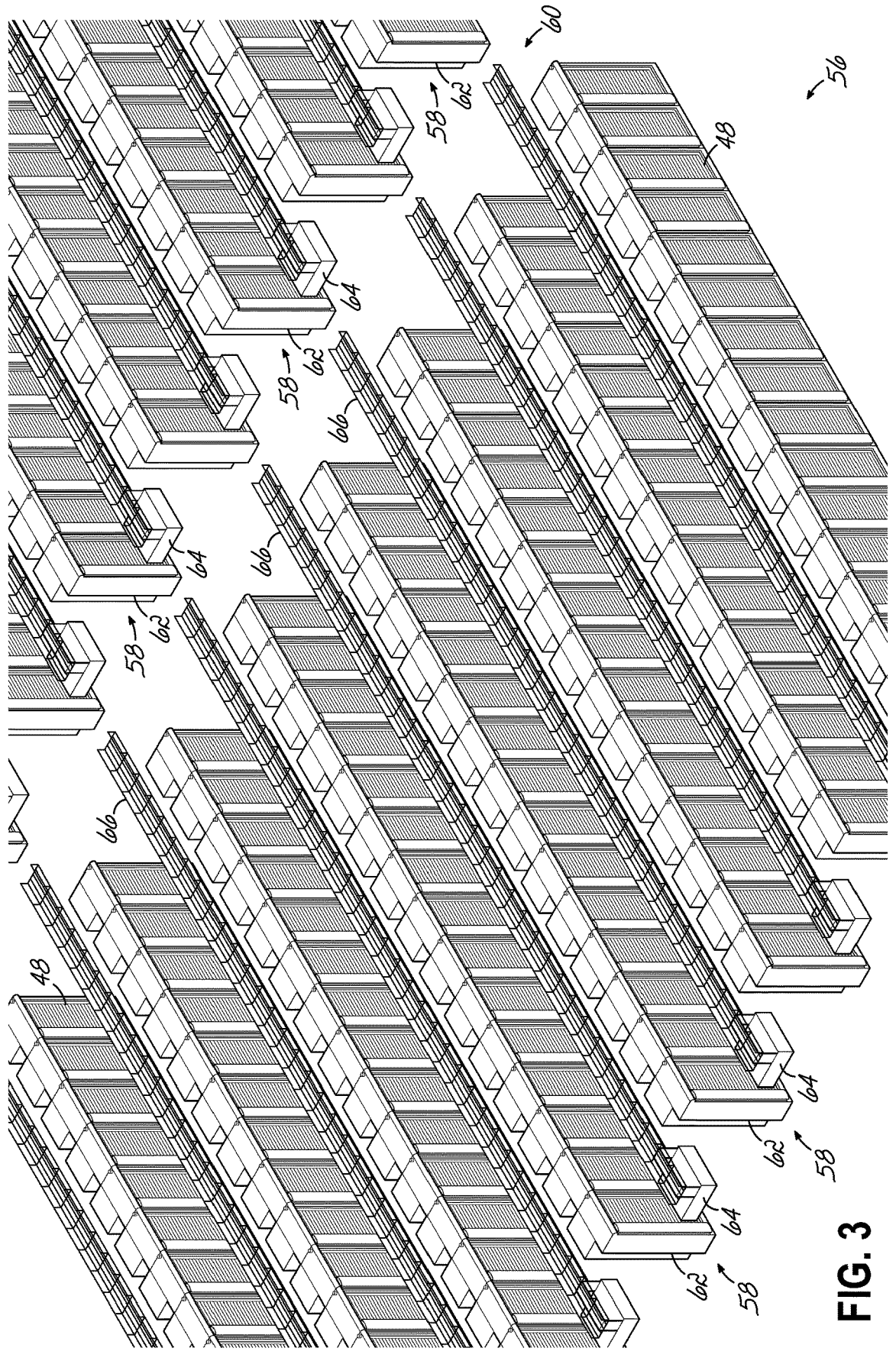
FIG. 3 is partial perspective view of an exemplary data hall of the data center shown in FIG. 1 according to one embodiment of the disclosure.

As illustrated in more detail in FIG. 3, the network equipment 48 in the main building 42 or an auxiliary building 44 may be arranged in one or more data halls 56 that generally include a plurality of spaced-apart rows 58 on one or both sides of an access pathway 60. The arrangement of the data halls 56 into rows 58 helps organize the large number of equipment, fiber optic cables, fiber optic connections, etc. Each of the rows 58 includes a plurality of racks or cabinets 62 (referred to hereafter as "racks 62") generally arranged one next to the other along the row 58. Each of the racks 62 are vertically arranged frames for holding various network equipment 48 of the data center 40, as is generally known in the fiber optics industry. In one common arrangement, and as further illustrated in FIG. 3, each row 58 may include a patch panel 64 at the front or head end of the row 58 closest to the access pathway 60. The patch panel 64 represents a termination point of at least some of the optical fibers carried by one or more of the indoor cables 54, for example. In other embodiments, the patch panel 64 may be located within the associated row, such as in the middle of the row.

Figure 1:
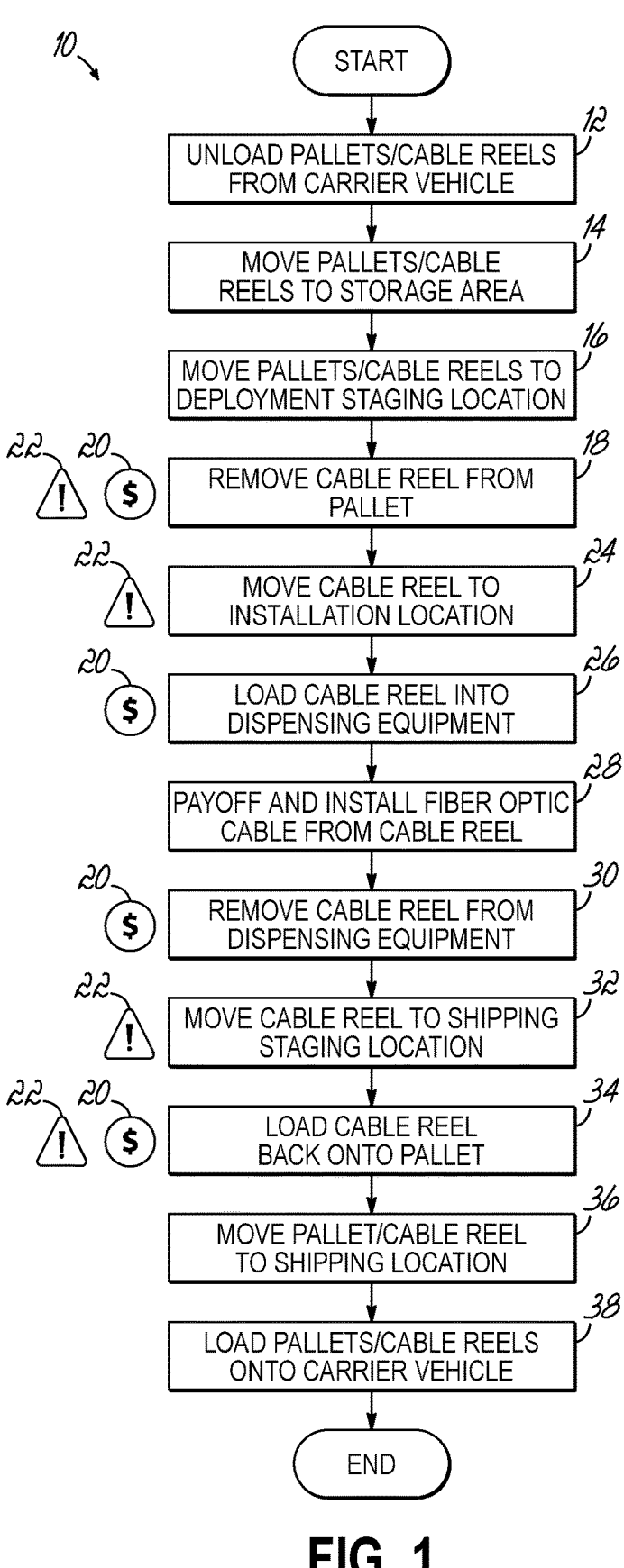
FIG. 1 is a flowchart showing an exemplary process for moving a fiber optic cable reel at an installation site according to the prior art.

As discussed above, in a conventional arrangement, one or more distribution cables are connected to the patch panel 64 of a row 58 and routed along a cable tray 66 generally disposed above the row 58. The network equipment 48 in the racks 62 is then optically connected to the one or more distribution cables to provide the interconnectivity of the network equipment 48 of the data center 40. From the above, it should be clear that large amounts of fiber optic cable are required during the construction of the data center 40. As also discussed above, the large amount of fiber optic cable is typically supplied to the data center 40 during its construction in numerous fiber optic cable reels. The cable reels are then moved around the data center 40 as needed to install the fiber optic cable. FIG. 1 described the current approach to handling fiber optic cable reels at an installation site, such as data center 40. Aspects of the present disclosure provide improved devices and methods for handling fiber optic cable reels at an installation site that address many of the drawbacks of the current approach described above.

Figure 4:
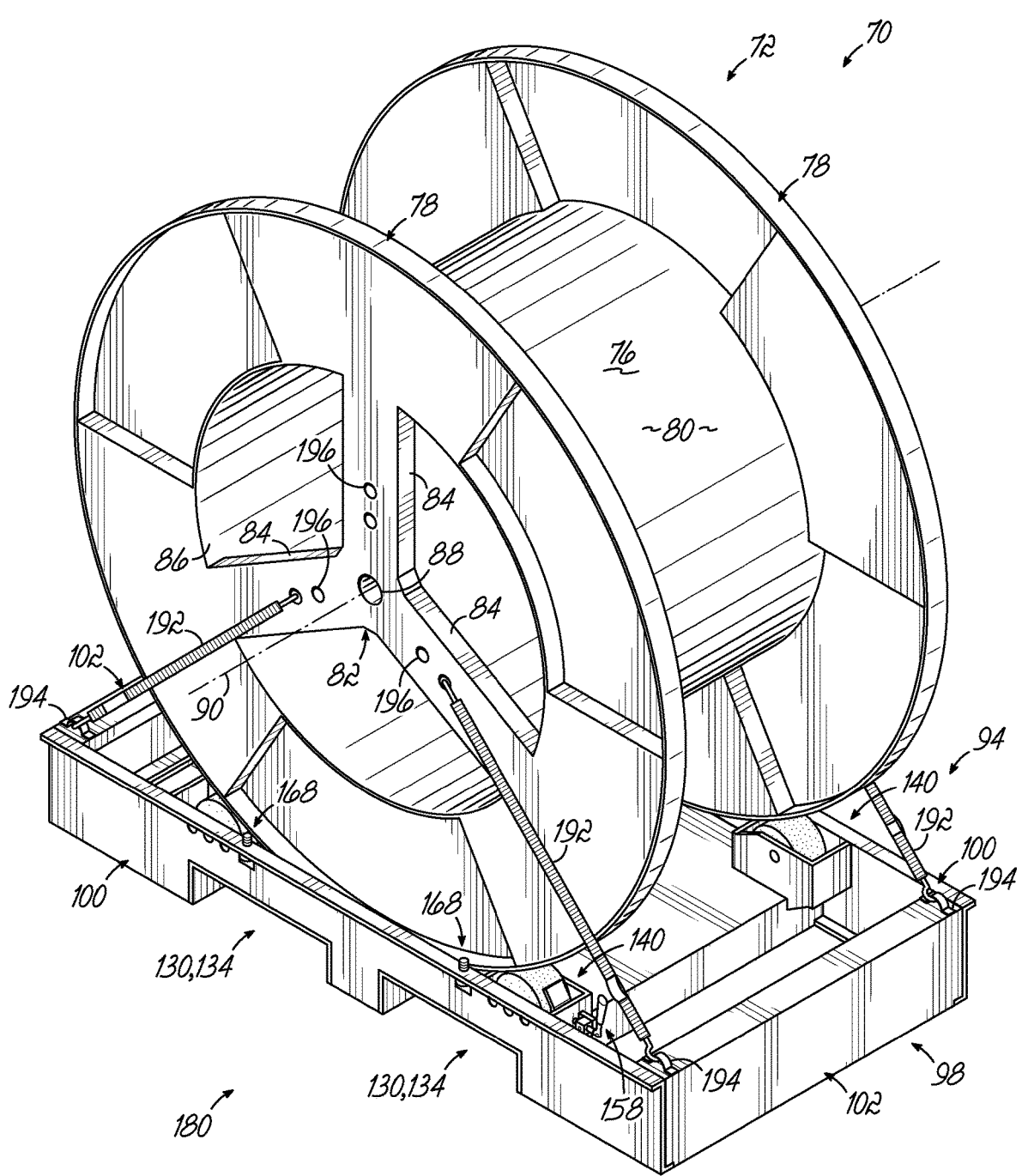
FIG. 4 is a perspective view of a fiber optic cable reel assembly according to one embodiment of the disclosure.
Figure 6:
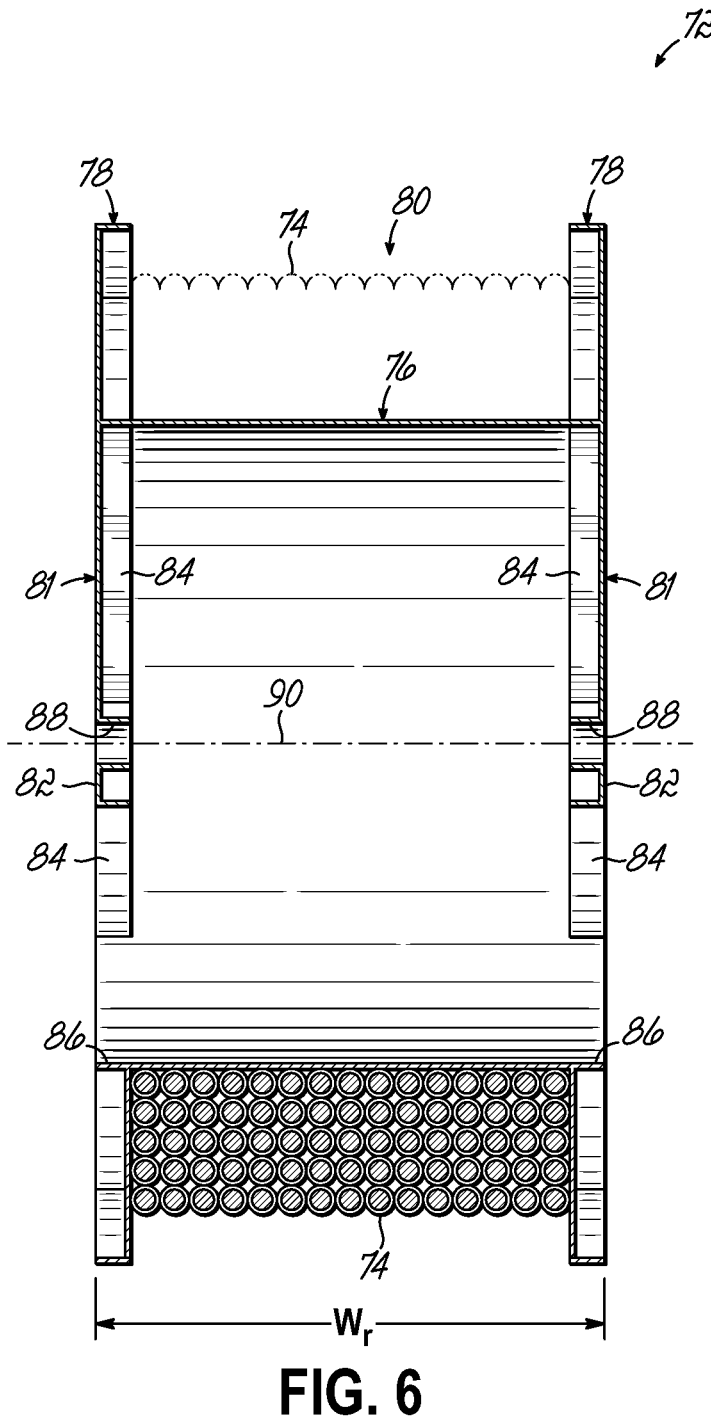
FIG. 6 is a cross-sectional view of the fiber optic cable reel shown in FIG. 5 taken along line 6-6.

FIG. 4 illustrates a multi-function system 70 for handling a fiber optic cable reel 72 (referred to as "handling system 70") that contains a generally continuous supply of fiber optic cable 74 in a wound configuration about the cable reel 72 (see FIG. 6). In one aspect, the handling system 70 is an integrated system that facilitates the movement of the cable reel 72 at the installation site and further facilitates the dispensing (e.g., the payoff) of the fiber optic cable 74 disposed thereon during installation of the fiber optic cable 74 such as along desired cable pathways. In other words, the handling system 70 essentially performs the function of the pallet used in the transport and handling of the cable reel and the function of the dispensing equipment used during installation of the fiber optic cable, but in a single integrated system. As will be explained in more detail below, the integrated handling system 70 addresses many of the drawbacks of the current arrangement and provides the improvements sought by many cable manufacturers and installers.

Figure 5:
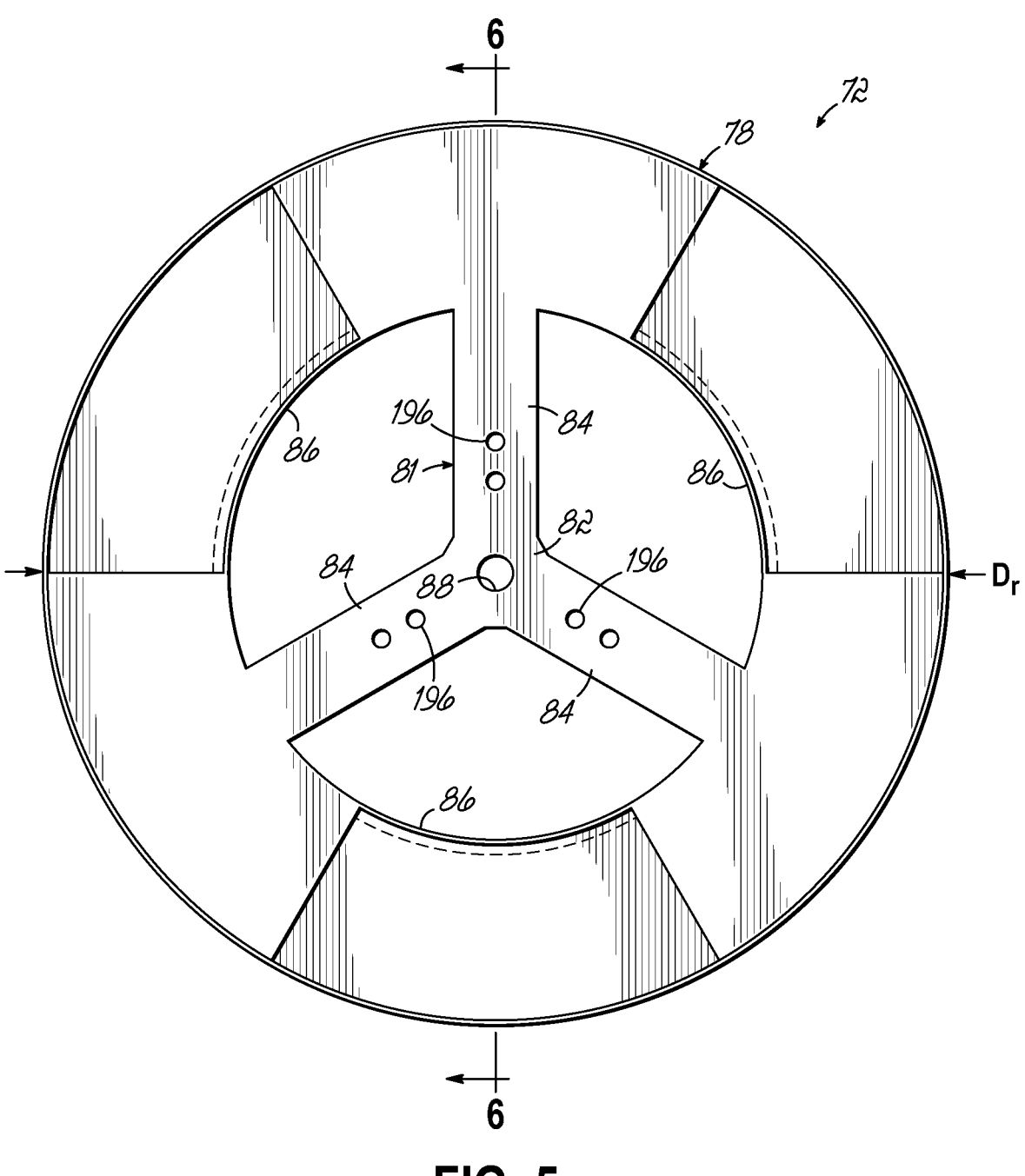
FIG. 5 is a side plan view of a fiber optic cable reel according to one embodiment of the disclosure.

Before describing the handling system 70, it may be instructive to first describe the cable reel 72, on which the fiber optic cable 74 is delivered to the data center 40 or other installation site. In an exemplary embodiment, and as illustrated in FIGS. 4-6, the cable reel 72 includes a cylindrical drum or hub 76 and a pair of cylindrical, disc-shaped flanges 78 attached to the hub 76 at opposed ends thereof. The flanges 78 have a diameter greater than the hub 76 to define an annular cavity 80 between the hub 76 and two flanges 78 configured to receive the fiber optic cable 74 in a wound arrangement. The diameter of the hub 76 may be determined, at least in part, by the minimum bending radius permitted for the type of fiber optic cable being moved onto the cable reel 72. The largest dimension of the cable reel 72 is typically defined by the size of the flanges 78, which is limited by the size of the hallways, corridors, access pathways, and/or doorways in the data center 40 through which the cable reels 72 (and related moving equipment) must pass. By way of example, and without limitation, the flanges 78 of the cable reel 72 may have a diameter between about 1.5 meters (m) and about 2.1 m. It should be understood, however, that the handling system 70 may be configured to operate with cable reels 72 having a size greater than or less than this range.

In one embodiment of the disclosure, to reduce the weight and material usage in the cable reel 72, the hub 76 may be generally hollow and the flanges 78 may be annular rings such that the radially inner portions of the cable reel 72 are hollow. To provide additional strength, however, each of the flanges 78 may include a support brace 81. In one embodiment, each support brace 81 may have a spoked configuration with a central disc 82 and plurality of spokes 84 (e.g., such as three spokes 84) extending from the central disc 82 to an inner edge 86 of a respective flange 78. The central disc 82 includes an opening or bore 88 that generally defines a central axis 90 of the cable reel 72.

As described above, materials such as wood, cardboard or other materials that generate particulate matter are generally prohibited from entering the data center 40 due to the sensitive network equipment 48 in the data halls 56. Accordingly, in an exemplary embodiment, the cable reel 72 may be made from a suitable engineering plastic, metal, or other non-particulate material of sufficient strength. In one embodiment of the disclosure, the cable reel 72 may be made from polycarbonate, polyethylene, polypropylene, polyethylene terephthalate, polyvinyl chloride, acrylonitrile-butadiene-styrene, or other suitable plastics. In another embodiment, the cable reel 72 may be made from steel or other suitable metal. In still a further embodiment, the cable reel 72 may be made from a combination of plastic and steel. Other materials may also be possible so long as the material satisfies the structural requirements for the cable reel 72 and does not produce any appreciate particulate matter during use that could disrupt operation of the network equipment 48 in the data center 40.

Turning now to the handling system 70, and in reference to FIGS. 4 and 7-10, the handling system 70 includes a base body 94 and a roller assembly 96 attached to the base body 94, the roller assembly 96 is configured to rotatably support the cable reel 72 when the cable reel 72 is mounted on the base body 94. In accordance with an aspect of the disclosure, the base body 94 has a "palletized" configuration, i.e., the base body 94 is configured to be sized similar to standard pallets used in the transit industry and is configured to interface with conventional pallet handling equipment, such as forklifts and pallet jacks, in a manner similar to standard pallets. In other words, the base body 94 is configured to operate much like the pallet described above in reference to FIG. 1 and the conventional process flow 10.

To this end, the base body 94 includes a generally rectangular outer frame 98 including a pair of transverse struts 100 and a pair of longitudinal struts 102, each strut 100, 102 being connected to an adjacent strut 102, 100 at its respective ends. The size of the base body 94 may be determined, at least in part, by the maximum size of the cable reel 72 the base body 94 is expected to carry. When the cable reel 72 is loaded onto the base body 94, the central axis 90 of the cable reel 72 is generally parallel to the transverse struts 100 and generally perpendicular to the longitudinal struts 102. Said in a different way, when the cable reel 72 is loaded onto the base body 94, the flanges 78 of the cable reel 72 are generally parallel to the longitudinal struts 102 and generally perpendicular to the transverse struts 100 (e.g., see FIG. 4). Additionally, since the cable reel 72 typically has a diameter Dr greater than a width $W_r$ of the cable reel 72 (e.g., along the central axis 90), the longitudinal struts 102 of the base body 94 are generally longer than the transverse struts 100 of the base body 94. However, base bodies with different aspect ratios are possible.

By way of example, and without limitation, the maximum size of the cable reel 72 the base body 94 is configured to carry may be about 2.1 m in diameter and about 1 m in width. In an exemplary embodiment, the base body 94 may be sized just slightly larger than the maximum diameter Dr of the cable reel 72 in a base length direction L$_b$ and just slightly larger than the maximum width W$_r$ of the cable reel 72 in a base width direction W$_b$, such as by between about 5% and about 10% greater than the maximum cable reel dimensions for each of the length and width directions. However, it should be understood that the dimensions of the base body 94 may vary for different applications, but generally has dimensions just slightly larger than the size of the maximum cable reel the base body is expected to carry.

Figures 7, 7A:
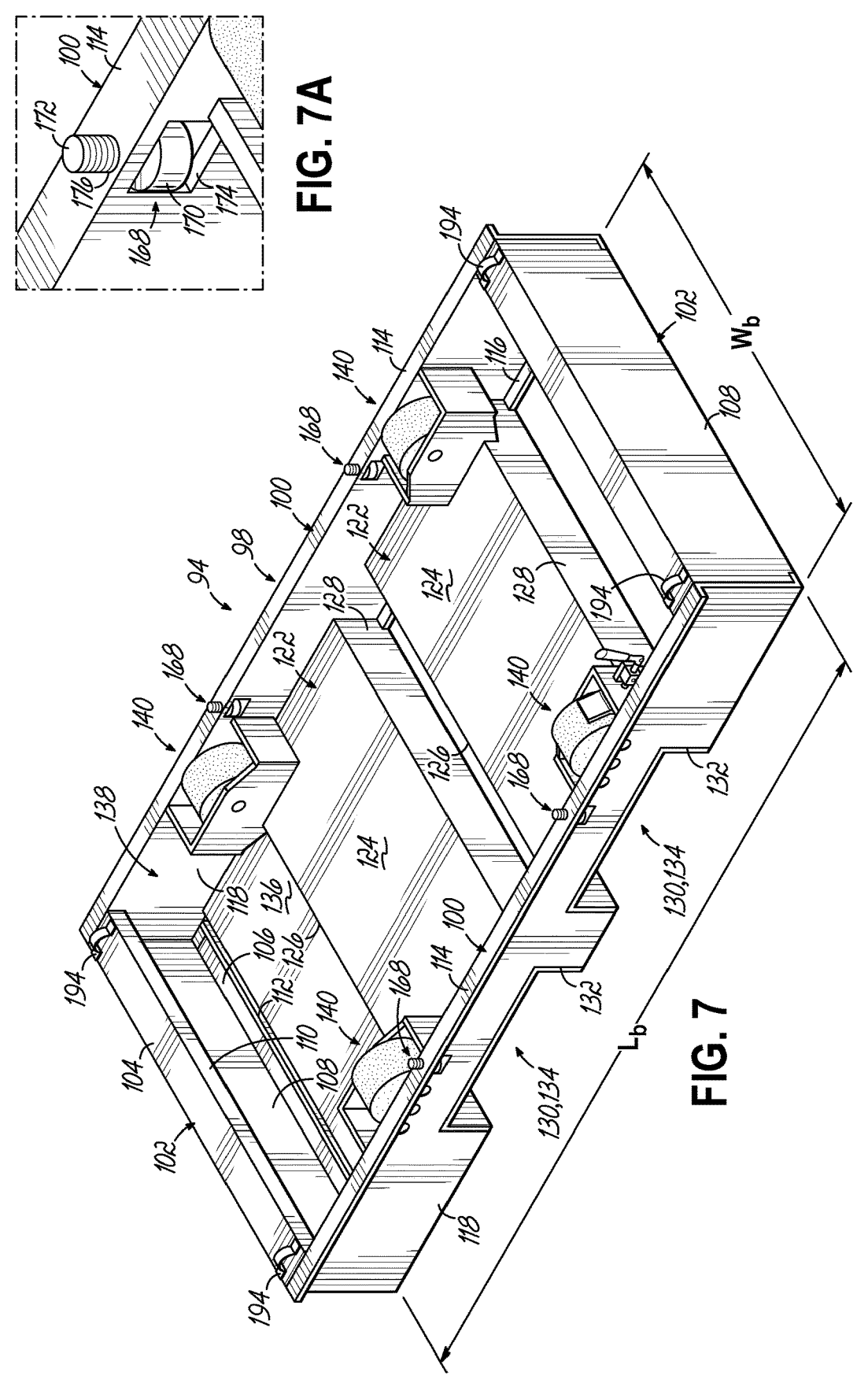
FIG. 7 is a perspective view of a handling system for a fiber optic cable reel in accordance with an embodiment of the disclosure.
FIG. 7A is an enlarged view of a portion of the handling system shown in FIG. 7.
Figure 8:
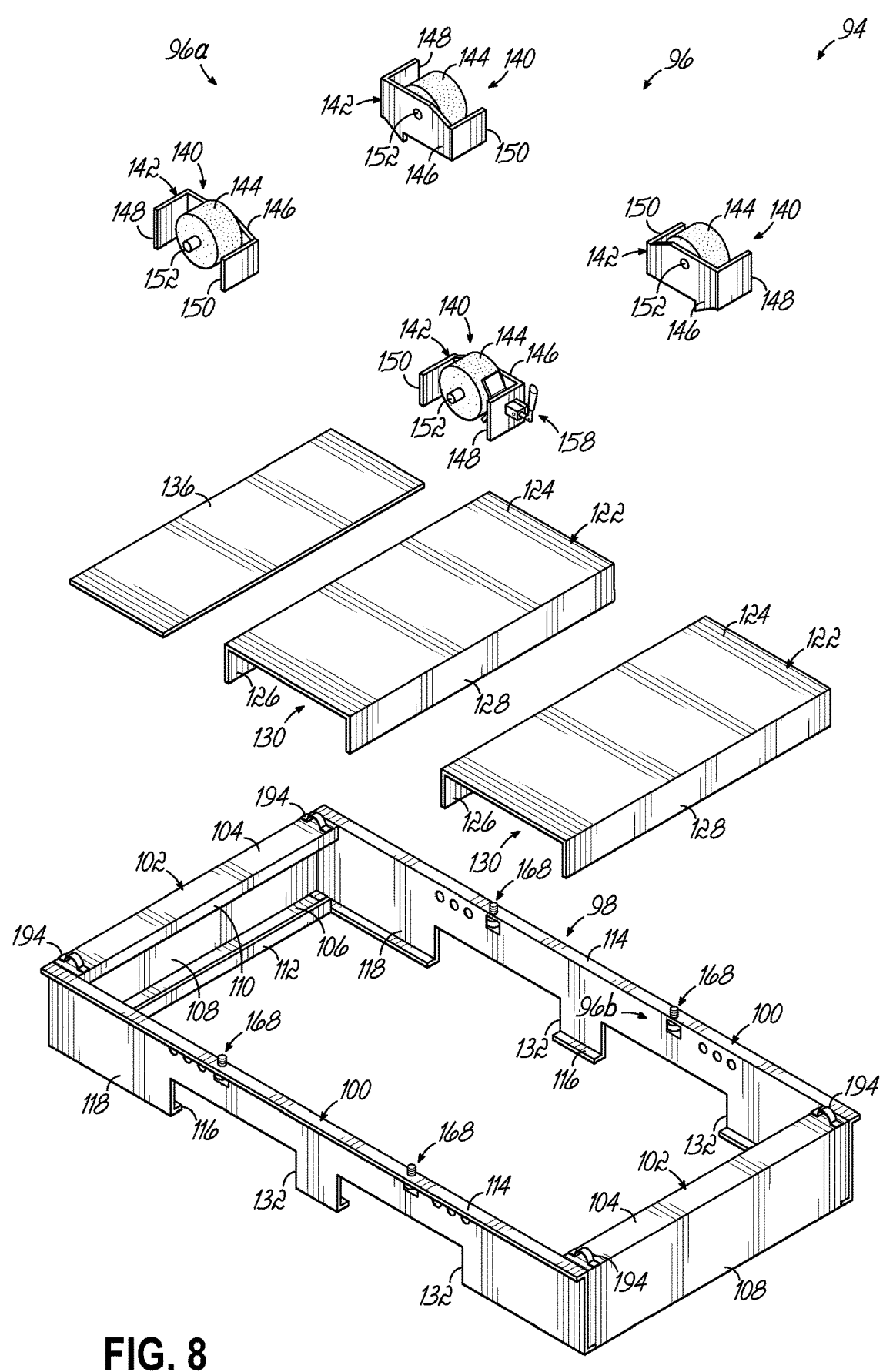
FIG. 8 is a disassembled perspective view of the handling system shown in FIG. 7.

In an exemplary embodiment, each of the transverse struts 100 may have a similar construction and be formed from a C-shaped channel or beam having a top wall 104, a bottom wall 106, and a side wall 108 extending between corresponding outer edges of the top wall 104 and the bottom wall 106. The inner edges of the top wall 104 and the bottom wall 106 may include tabs 110, 112, respectively, that extend toward each other but do not close the inner side of the beam. In other words, the open side of the beams that form the longitudinal walls 100 faces toward the interior of the outer frame 98 of the base body 94, as shown in FIGS. 7 and 8. While the transverse struts 100 have been described above as being formed by C-shaped beams, the transverse struts 100 may have other configurations that remain within the scope of the present disclosure. For example, the transverse struts 100 may be configured as rectangular beams, I-beams, H-beams, T beams, or other configurations. The beams are preferably hollow members but may be solid beams in certain alternative embodiments. Thus, aspects of the base body 94 should not be limited to a certain construction of the transverse struts 100 as a wide range of structural members will suffice.

In an exemplary embodiment, each of the longitudinal struts 102 may have a similar construction and may be formed from a Z-shaped channel or beam having a top flange 114, a bottom flange 116, and a side wall 118 extending between the top flange 114 and the bottom flange 116. The top flange 114 and the bottom flange 116 extend in opposite directions relative to the side wall 118 to provide the Z-shape profile of the longitudinal struts 102. In an exemplary embodiment, for example, the top flange 114 extends toward the exterior of the outer frame 98 of the base body 94 and the bottom flange 116 extends toward the interior of the outer frame 98 of the base body 94. While the longitudinal struts 102 have been described above as being formed by Z-shaped beams, the longitudinal struts 102 may have other configurations that remain within the scope of the disclosure, such as those described above. Thus, aspects of the base body 94 should not be limited to a certain construction of the longitudinal struts 102 as a wide range of structural members will suffice.

In addition to the above, the base body 94 may further include one of more platforms 122 extending between the longitudinal struts 102 and along a central region of the outer frame 98. In an exemplary embodiment, for example, the base body 94 includes two spaced-apart platforms 122; however, more or fewer platforms 122 may be possible in alternative embodiments. In one embodiment, each platform has an inverted U-shape, including a top wall 124 and two opposed side walls 126, 128 depending downwardly from opposed side edges of the top wall 124. The top wall 124 and opposed side walls 126, 128 generally define a cavity 130, the purpose of which will be described below. As shown in FIGS. 4-7, the top wall 124 of the platforms 122 is generally located between the top flange 114 and the bottom flange 116 of the Z-shaped channel that forms the longitudinal struts 102. For example, the top wall may be positioned between about 30% and about 70%, and preferably about 50% of the distance between the top flange 114 and the bottom flange 116 of the longitudinal struts 102. Other values, however, may also be possible.

The side walls 126, 128 of the platforms 122 extend between the longitudinal struts 102 and may be arranged generally parallel to the transverse struts 100 of the outer frame 98. In an exemplary embodiment, the side walls 126, 128 extend downwardly from the top wall 124 such that lower edges of the side walls 126, 128 are substantially flush with the bottom flange 116 of the Z-shaped channel that forms the longitudinal struts 102. The longitudinal struts 102 include a cutout or notch 132 that coincides with the cavity 130 of each of the platforms 122. In this way, the platforms 122 define a plurality of generally parallel engagement slots 134 that are open from below the base body 94 and from the sides of the base body 94 corresponding to the longitudinal struts 102. The engagement slots 134 are configured to receive one or more tongs from conventional pallet handling equipment in a manner similar to traditional pallets. In other words, the engagement slots 134 operate as a connection interface between the base body 96 and conventional tong-based pallet handling equipment for moving the base body 96 (and any cable reel 72 mounted thereon) around an installation site.

In one embodiment, the base body 96 may further include a floor plate 136 disposed between the outer side wall 126 of one of the platforms 122 and the adjacent transverse strut 100 to essentially form at least a portion of a bottom wall of the base body 94. The floor plate 136 generally extends between the longitudinal struts 102 of the outer frame 98 and may be supported on the bottom flanges 116 thereof. The transverse strut 100, the side wall 126 of the adjacent platform 122, the longitudinal struts 102, and the floor plate 136 collectively define a storage cavity 138, generally closed on all sides but for an upper side thereof, for storing various items, such as retention straps, tools, or other devices associated with the handling system 70. Storing various items in the storage cavity 138 reduces the likelihood of losing or misplacing the items when not in use with the handling system 70. In one embodiment, the base body 94 includes only one storage cavity 138. In another embodiment, however, a second floor plate may be disposed between the outer side wall 126 of the other platform 122 and the other adjacent transverse strut 100 to form a second storage cavity in the base body 94 (not shown).

As discussed above, the cable reel 72 is configured to be supported on the base body 94 by a roller assembly 96 that is configured to rotatingly support the cable reel 72. In one embodiment, the roller assembly 96 includes a first roller assembly 96a configured to generally vertically support the cable reel 72 on the base body 94, and optionally a second roller assembly 96b configured to generally horizontally support the cable reel 72 on the base body 94. In an exemplary embodiment, the first roller assembly 96a my include a plurality of roller blocks 140, each being separately attached to the base body 94 so as to vertically support the cable reel 72 on the base body 94 but allow the cable reel 72 to rotate.

In an exemplary embodiment, each roller block 140 includes a roller housing 142 and a roller 144 supported at least in part by the roller housing 142. In one embodiment, the roller housing 142 includes a U-shaped bracket having a side wall 146 and a pair of end walls 148, 150 extending from edges of the side wall 146. The roller 144, such as a wheel or the like, includes a central axle 152 about which the roller 144 rotates. The side wall 146 of the roller housing 142 includes a bore configured to receive one end of the central axle 152 therein (see FIG. 9) such that central axle 152 extends from the side wall 146 and the roller 144 is generally disposed between the end walls 148, 150 of the roller housing 142, as shown in FIGS. 4 and 7.

In one embodiment, each of the roller blocks 140 is configured to be coupled to an inner surface of the longitudinal struts 102. For example, in one embodiment, the side wall 118 of each longitudinal strut 102 of the outer frame 98 may be configured to include at least two roller blocks 140 attached thereto in spaced-apart relation. In an alternative embodiment, however, each longitudinal strut 102 may include more than two roller blocks 140 and it should be understood that other arrangements of the roller blocks 140 on the longitudinal struts 102 are possible. Each roller block 140 may be attached to its longitudinal strut 102 such that the side wall 146 of the roller housing 142 is spaced from and generally parallel to the side wall 118 of the longitudinal strut 102 and the end walls 148, 150 of the roller housing 142 are generally perpendicular to the sidewall 118 of the longitudinal strut 102. The side wall 118 of the longitudinal strut 102 includes at least one bore configured to receive the other end of the central axle 152 therein and thereby support the roller 144 in the roller housing 146. Additionally, the outer edges of the end walls 148, 150 may engage or nearly engage with the inner surface of the side wall 118 of the respective longitudinal strut 102. In this orientation, the central axles 152 of the rollers 144 may be generally perpendicular to the longitudinal struts 102 and generally parallel to the transverse struts 100 of the outer frame 98 of the base body 94. Collectively, the central axles 152 of the rollers 144 of the roller blocks 140 are generally parallel to each other and generally parallel to the central axis 90 of the cable reel 72, as illustrated in FIG. 4.

Figure 9:
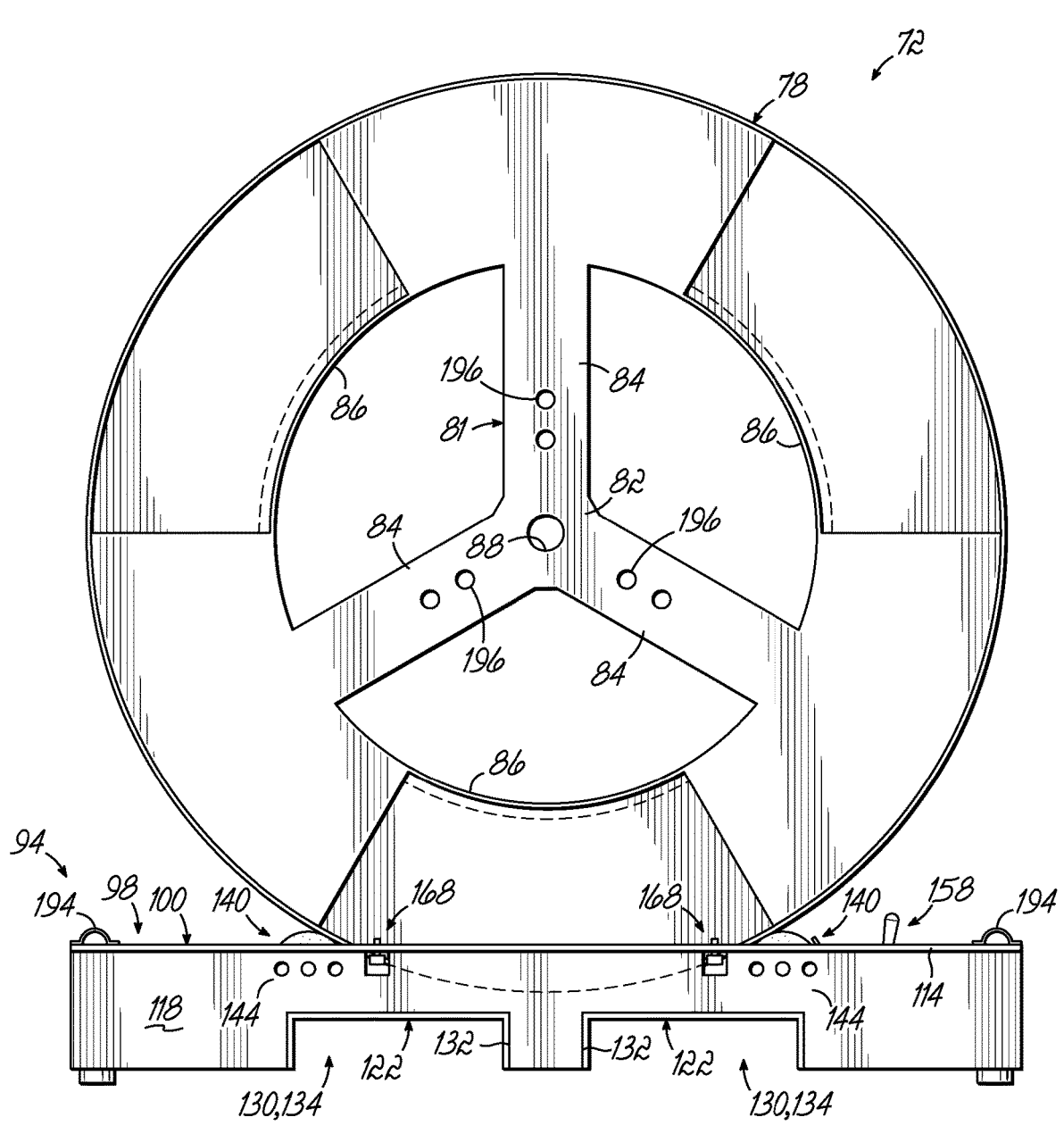
FIG. 9 is a side plan view of the fiber optic cable reel assembly shown in FIG. 4 (with the retention straps removed for clarity).
Figure 10:
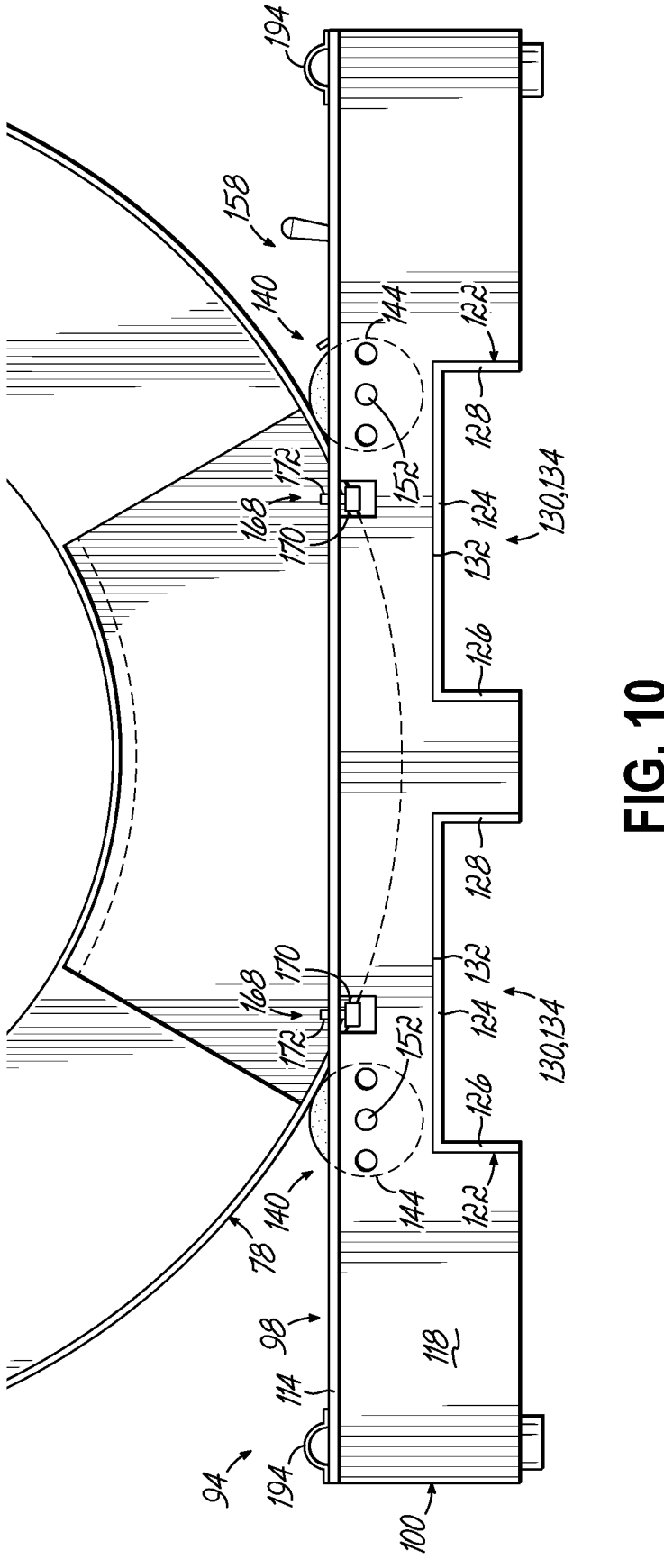
FIG. 10 is an enlarged side plan view of a portion of the fiber optic cable reel assembly shown in FIG. 9.

The spacing between the two roller blocks 140 on each longitudinal strut 102 may be determined by the size of the cable reel 72 being mounted to the base body 94, where the larger the cable reel 72 the greater the roller blocks 140 on each longitudinal strut 102 are separated from each other and vice versa. By way of example, when the cable reel 72 is mounted on the base body 94, the angle subtended by the spaced apart roller blocks 140 relative to the central axis 90 of the cable reel 72 may be between about 30 degrees and about 90 degrees, and preferably about 60 degrees (see FIG. 9). However, other subtended angles may be possible as well. In one embodiment, the roller blocks 140 are permanently connected to the base body 94, such as by welding or other type permanent fixture of the roller housings 142 to the longitudinal struts 102. In this embodiment, the base body 94 is configured to have only one size of cable reel 72 mounted thereon. In an alternative embodiment, however, the roller blocks 140 may be adjustably connected to the longitudinal struts 102 so that the distance between the roller blocks 140 may be adjusted to accommodate different sizes of cable reels 72 configured to be mounted on the base body 94. For example, as shown in FIG. 9, the side wall 118 of the longitudinal struts 102 may include a plurality of bores each configured to receive an end of the central axle 152 of the rollers 144, and thereby allow the spacing between the roller blocks 140 to be adjusted. Alternatively, the side wall 118 of the longitudinal struts 102 may include an elongate slot (not shown) instead of a plurality of bores for slidably receiving an end of the central axle 152 of the rollers 144, and thereby allowing the spacing between the roller blocks 140 to be adjusted. In these embodiments, the central axles 152 may include a threaded element (e.g., a nut) to secure the roller housings 142 to the base body 94. Other means of adjustably connecting the roller blocks 140 to the transvers struts 102 are also possible.

When the roller blocks 140 are coupled to the base body 94, the rollers 144 are configured to extend above the top walls of the base body 94 such that the cable reel 72, when mounted thereon, engages with the rollers 144 of the roller housings 142 without engaging or without significantly engaging other portions of the base body 94. This is illustrated, for expel, in FIG. 9. In an exemplary embodiment, when the cable reel 72 is mounted on the base body 94 the flanges 78 of the cable reel 72 are configured to engage with the rollers 144 of the roller blocks 140. In this way, when desired, the cable reel 72 may be able to rotate without interference from the base body 94 other than that provided by the rollers 144 themselves. As noted above, when the cable reel 72 is mounted to the base body 94, the central axis 90 of the cable reel 72 is generally parallel to the central axles 152 of the rollers 144 and the cable reel 72 is able to rotate relative to the base body 94 but cannot generally translate relative to the base body 94 in a direction perpendicular to its central axis 90. Thus, the cable reel 72 is able to roll in place relative to the base body 94 without translation.

Figure 11A:
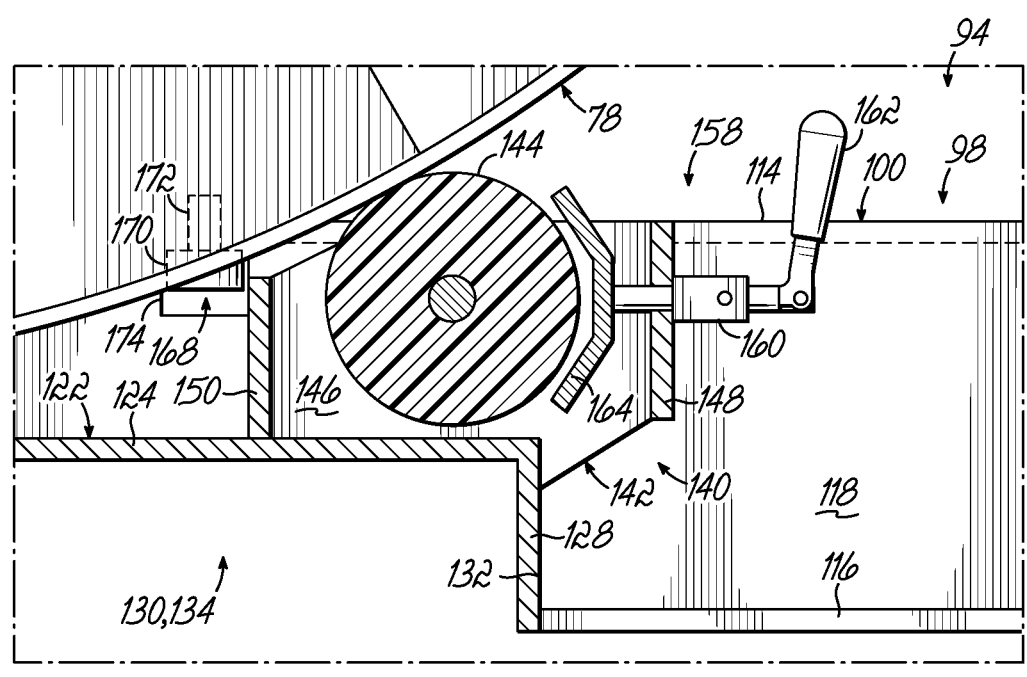
FIGS. 11A and 11B are partial cross-sectional views of a brake in accordance with an embodiment of the disclosure.
Figure 11B:
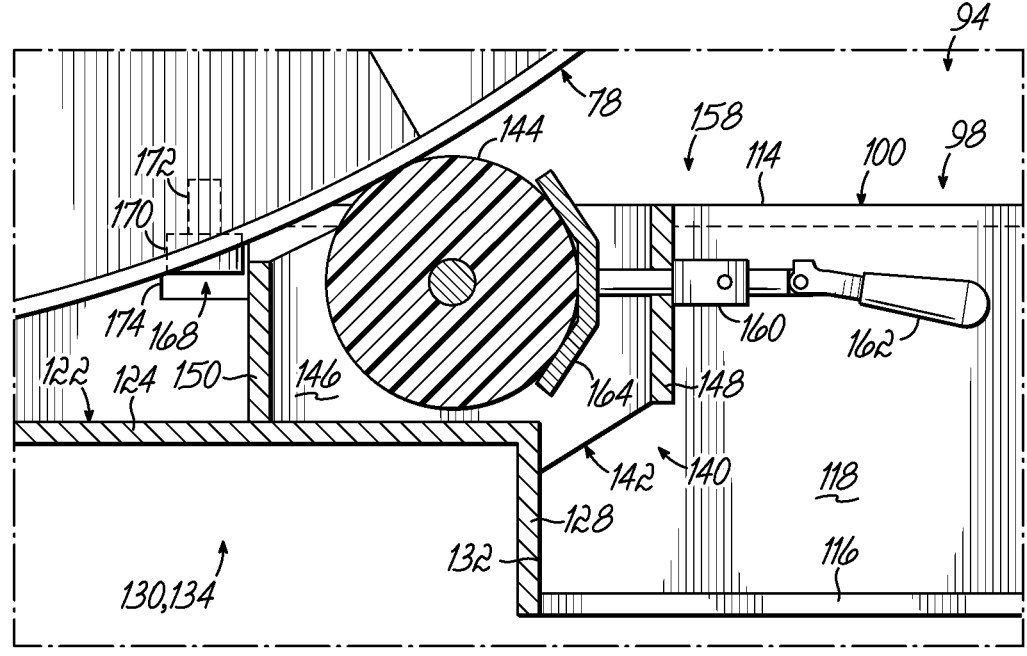
Figure 12:
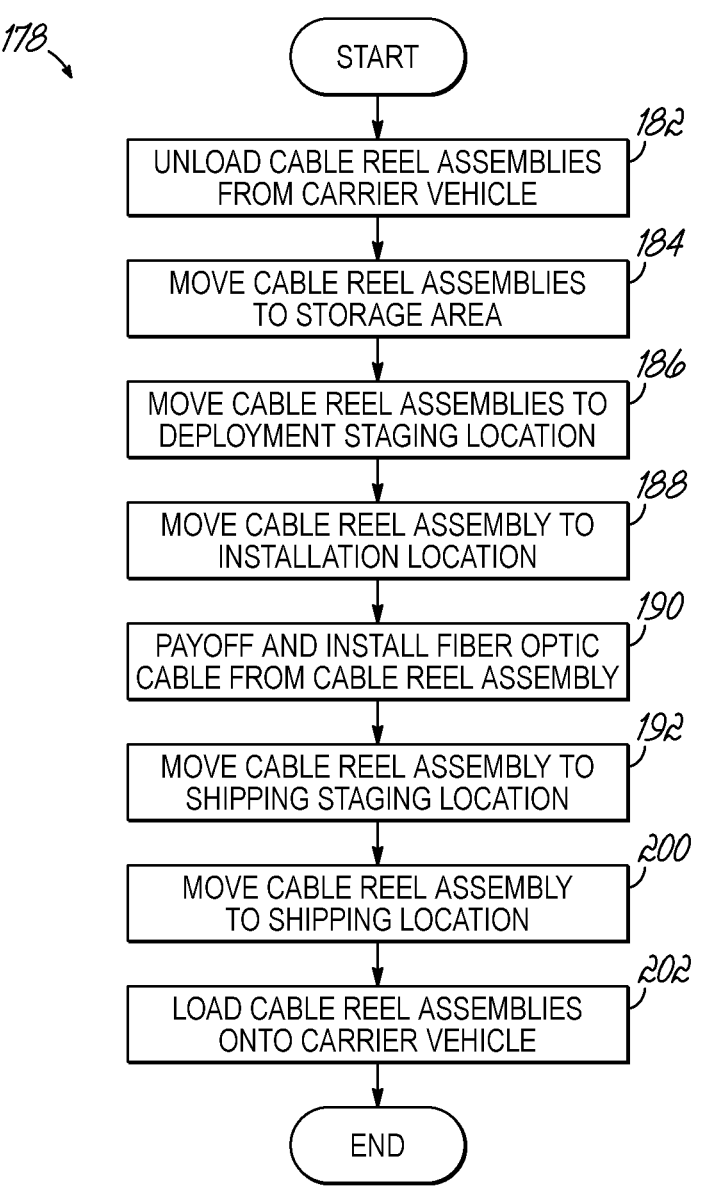
FIG. 12 is a flowchart illustrating a process for flow handling a fiber optic cable reel at an installation site in accordance with an embodiment of the disclosure.

While the ability of the cable reel 72 to rotate while being mounted on the base body 94 provides certain benefits, there may be many times when it is undesirable for the cable reel 72 to rotate while mounted to the base body 94. For example, during transport of the cable reel 72 to the installation site from the manufacturing facility, during transport of the cable reel 72 from the installation site to the manufacturing site, during movement of the cable reel 72 around the installation site, and at other possible times it may be undesirable to have the cable reel 72 rotatable relative to the base body 94. According, to prevent undesirable rotations of the cable reel 72, the handling system 70, and more particularly the first roller assembly 96a, may include one or more brakes 158 that prevent or limit the rotation of one or more respective rollers 144. In one embodiment, for example, at least one of the roller blocks 140 of roller assembly 96a includes the brake 158. In an exemplary embodiment, and as best shown in FIGS. 11A and 11B, the brake 158 may include a brake housing 160 mounted to the roller housing 142, a movable brake actuator 162, and a brake pad 164 operatively coupled to the bracket actuator 162 and moveable between an engaged position and a release position.

As illustrated in these figures, and in one embodiment, the brake housing 160 may be connected to the outer end wall 150 of the roller housing 142; however, the position of the brake housing 160 is not limited to this position and may be connected to the other walls of the roller housing 142 in alternative embodiments. In one embodiment, the bracket actuator 162 may be configured as a lever having a handle for grasping by a technician or the like. In the release position (FIG. 11A), the brake pad 164 is in non-contact relation with the roller 144 and the roller 144 may rotate freely. When it is desired to limit or prevent rotation of the cable reel 72 on the base body 94, the technician may move the brake actuator 162 to thereby move the brake pad 164 from the release position to the engaged position (FIG. 11B). In the engaged position, the brake pad 164 engages with the roller 144, thereby limiting or preventing rotation of the roller 144 through the frictional engagement between the roller 144 and the brake pad 164. In one embodiment, the brake actuator 162 may be configured as an over-center spring arrangement for maintaining the actuator in either the release position and/or engaged position. When it is desired to payoff some of the fiber optic cable 74 on the cable reel 72, the installer may move the brake actuator 162 from the engaged position to the release position to allow the cable reel 72 to rotate relative to the base body 94. For example, the cable reel 72 may be rotated through manual rotation of the cable reel 72 or by pulling on the fiber optic cable to thereby rotate the cable reel 72. During the installation of the fiber optic cable 74, the cable reel 72 may be selectively moved between the release position and engaged position as needed.

As discussed above, the roller assembly 96 may further include a second roller assembly 96b configured to generally horizontally support the cable reel 72 on the base body 94. More particularly, as best shown in FIG. 4, the second roller assembly 96b is configured to horizontally support the cable reel 72 relative to movements in a direction generally parallel to the central axis 90 of the cable reel 72. To this end, the second roller assembly 96b may include a plurality of roller elements 168, each being separately attached to the base body 94 so as to horizontally support the cable reel 72 on the base body 94 and guide the rotation of the cable reel 72. In an exemplary embodiment, and as illustrated in FIGS. 7A, 11A and 11B, each roller element 168 may include a roller 170, such as a wheel or the like, and a central roller axle 172 extending from the roller 170 and about which the roller 170 rotates. In one embodiment, the central roller axle 172 extends from only one side of the roller 170. In an alternative embodiment, however, the central roller axle 172 may extend from both sides of the roller 170, similar to that described above.

In one embodiment, each of the roller elements 168 is configured to be coupled to the longitudinal struts 102 of the outer frame 98 of the base body 96. For example, in one embodiment, each longitudinal strut 102 may be configured to include at least two roller elements 168 attached thereto in spaced-apart relation. In an alternative embodiment, however, each longitudinal strut 102 may include more than two roller elements 168 and it should be understood that other arrangements of the roller elements 168 on the longitudinal struts 102 are possible. In an exemplary embodiment, one roller element 168 is placed in close proximity to a corresponding roller block 140 of the roller assembly 96a. In other words, for each roller block 140, there may be a corresponding roller element 168 in close proximity thereto. Different arrangements of roller blocks 140 and roller elements 142 may be possible, however.

To accommodate the roller elements 168, the sidewall 118 of the longitudinal struts 102 may include a cutout or window 174 positioned just below the top flange 114 for receiving the roller element 168 therein. The top flange 114 of the longitudinal struts 102 may include a bore 176 for receiving the central roller axle 172 of the roller element 168 therein. The bore 176 and the central roller axle 172 may be threaded to facilitate the coupling of the roller element 168 to the base body 94 or a nut or other fastener may secure the roller element 168 to the base body 94. Much like the roller blocks 140, the spacing between the two roller elements 168 on each longitudinal strut 102 may be determined by the size of the cable reel 72 being mounted to the base body 94.

In one embodiment, the roller elements 168 may be attached to base body 94 so as to accommodate only one size of cable reel 72. In an alternative embodiment, however, the roller elements 168 may be adjustably connected to the longitudinal struts 102 so that the distance between the roller elements 168, may be adjusted to accommodate different sizes of cable reels 72 configured to be mounted on the base body 94. For example, the top flange 114 of the longitudinal struts 102 may include a plurality of bores 176 open to one or more windows 174, each configured to receive the central roller axle 172 of the roller element 168. Alternatively, the top flange 114 of the longitudinal struts 102 may include an elongate slot (not shown) instead of a plurality of bores for slidably receiving an end of the central roller axle 172 of the roller elements 168. Collectively, the central axles 172 of the rollers 170 of the roller elements 168 are generally parallel to each other and generally parallel to the central axles 152 of the rollers 144 of the first roller assembly 96a.

When the roller elements 168 are connected to the base body 94, the rollers 170 are configured to extend into the interior of the outer frame 98 of the base body 96 such that the cable reel 72, when mounted thereon, engages with the rollers 170 of the roller elements 168 without engaging or without significantly engaging other portions of the base body 94. In an exemplary embodiment, for example, the flanges 78 of the cable reel 72 are configured to engage with the rollers 170 of the roller elements 168. In this way, when desired, the cable reel 72 may be able to rotate without interference from the base body 94 other than that provided by the rollers 144 and rollers 170. As noted above, when the cable reel 72 is mounted to the base body 94, the central axis 90 of the cable reel 72 is generally perpendicular to the central roller axles 172 of the rollers 170 and the cable reel 72 is able to rotate relative to the base body 94 but cannot generally translate relative to the base body 94 in a direction generally parallel to the central axis 90 of the cable reel 72. Thus, again, the cable reel 72 is able to roll in place relative to the base body 94 without translation.

As noted above, to avoid the issues presented by wood pallets and other particulate materials, in one embodiment, the handling system 70 may be formed from a suitable engineering plastic, metal, or other non-particulate material of sufficient strength. In one embodiment of the disclosure, the handling system 70 may be made from polycarbonate, polyethylene, polypropylene, polyethylene terephthalate, polyvinyl chloride, acrylonitrile-butadiene-styrene, or other suitable plastics. In another embodiment, the handling system 70 may be made from steel or other suitable metals. For example, substantially the entire base body 94 and the roller assembly 96 may be formed from metal. In some embodiments, a small portion of the handling system 70 may be formed from non-metal materials (such as rubber or other polymeric materials) that do not form particulate matter during use. In still a further embodiment, the handling system 70 may be made from a combination of plastic and steel. Other materials may also be possible so long as the material satisfies the structural requirements for the handling system 70 and does not produce any appreciate particulate matter during use that could disrupt operation of the network equipment 48 in the data center 40.

FIG. 9 illustrates an improved process flow 178 for handling fiber optic cable reels 72 at an installation site in accordance with an embodiment of the disclosure. In this embodiment, the fully-loaded cable reel 72 may be loaded onto the handling system 70 at the manufacturing facility. For example, the cable reel 72 may be loaded onto the handling system 70 such that the roller assembly 96, such as roller assembly 96a and optionally roller assembly 96b, supports the cable reel 72 on the handling system 70. Because the handling system 70 mimics the size and function of a conventional pallet, the combined handling system 70 and cable reel 72 may be shipped from the manufacturing facility to the installation site using standard shipping modes, such as LTL carrier networks. Moreover, the combined handling system 70 and cable reel 72 may be moved around the manufacturing facility and loaded onto a carrier truck or the like using conventional pallet handling equipment known in the shipping industry. For example, the one or more tongs of the conventional pallet handling equipment may be received in one or more respective engagement slots 134 in the base body 94 for raising, lowering, and moving the combined handling system 70 and cable reel 72 at the manufacturing facility. The combined handling system 70 and cable reel 72 will be referred to herein as the cable reel assembly 180.

At the installation site, and as indicated in step 182, upon arrival of the carrier truck at the installation site, the cable reel assemblies 180 may be removed from the carrier truck and optionally moved to a storage area at the installation site, as indicated in step 184. Similar to the above, because the handling system 70 mimics the size and function of a conventional pallet, the cable reel assemblies 180 may be removed from the carrier truck and moved around the installation site using conventional pallet handling equipment that is typically available at the installation site. For example, the one or more tongs of the conventional pallet handling equipment may be received in one or more respective engagement slots 134 in the base body 94 for raising, lowering, and moving the cable reel assemblies around the installation site. As indicated in step 186, when it comes time for the fiber optic cable 74 on a cable reel 72 to be installed at the installation site, the cable reel assembly 180 may be moved from storage to a deployment staging location using, for example, conventional pallet handling equipment. At the staging location, for example, the bandings or retentions straps that secure the cable reel 72 to the base body 94 may be removed. As can be appreciated, steps 182, 184, and 186 are somewhat similar to the initial steps in the conventional process 10 described above.

In a next step 188, the cable reel assembly 180 may be moved from the deployment staging location to an installation location at the installation site for routing the fiber optic cable 74 along desired cable pathways. By way of example, and as noted above, in large scale data centers 40, the cable reel assembly 180 may be moved to a data hall 56 for installation of the fiber optic cable 74. This step, however, is very different from the conventional process 10 described above and the advantages provided by handling system 70 are made clear. For example, because the handling system 70 is formed from non-particulate materials (e.g., steel, plastic or combinations thereof), the handling system 70 is permitted to enter the interior of the data center 40. Accordingly, the cable reel 72 does not have to be removed from the handling system 70 in order to move the cable reel 72 within the interior of the data center 40. Instead, the cable reel 72 and the handling system 70 may be maintained as an assembly (i.e., not separated from each other) when moving the cable reel 72 within the interior of the data center 40 such as in a data hall 56.

This has several advantages. First, because the cable reel 72 is not removed from the handling system 70, the need for specialized lifting equipment at the installation site to achieve this movement is completely avoided. Thus, the costs associated with the rental of such specialized lifting equipment and the logistics of having the lifting equipment available at the installation site are also avoided. Second, because the handling system 70 is maintained with the cable reel 72, a pallet jack or other non-powered conventional pallet handling equipment may be used to move the cable reel 72 around the interior of the data center 40. In other words, the connection interface (e.g., the engagement slots

134 defined in the base body 94) that allows non-powered conventional pallet handling equipment, like a pallet jack, to be used to move the cable reel 72 around the data center 40 is now maintained or kept with the cable reel 72. In this way, a pallet jack or the like may be used to move the cable reel 42 (in the form of the cable reel assembly 180) from the staging location to the installation location in the data center 40. Thus, there is no longer a need to manually roll the cable reel 72 down hallways and corridors or through door openings to move the cable reel 72 to the installation location. Instead, the cable reel assembly 180 may be moved within the interior of the data center 40 using a pallet jack, for example. The pallet jack allows the cable reel assembly to be moved in a safe and controlled manner relative to the manual means of the conventional process 10.

Once the cable reel assembly 180 is moved to the installation location, and in a next step 190 of the improved process 178, the fiber optic cable 74 on the cable reel 72 may be installed along desired cable pathways in the data hall 56, for example. To this end, the one or more brakes 158 associated with the handling system 70 may be moved from the engaged position to the release position, thereby allowing the cable reel 72 to rotate relative to the handling system 70. An amount of fiber optic cable 74 may then be paid off of the cable reel 72 to achieve its installation. In this process 178, the need for specialized dispensing equipment at the installation site for paying off the fiber optic cable 74 is completely avoided. Thus, the costs associated with the rental of such specialized dispensing equipment and the logistics of having the dispensing equipment available at the installation site are also avoided. Instead, the equipment that allows the fiber optic cable 74 to be paid off from the cable reel 72 is provided by the handling system 70, which forms part of the cable reel assembly 180.

When the supply of fiber optic cable 74 on the cable reel 72 has been depleted, as indicated in step 192, the cable reel assembly 180 may be moved to a shipping staging location to prepare the cable reel 72 to be shipped back to the manufacturing facility. In this step, there is no need to remove the cable reel 72 from any type of separate specialized dispensing equipment before moving the cable reel 72 to the shipping staging location. Instead, the cable reel assembly 180 is immediately moveable to the shipping staging location using the pallet jack or other type of non-powered conventional pallet handling equipment. Additionally, there is no longer a need to manually roll the cable reel 72 down hallways and corridors or through door openings to move the cable reel 72 from the installation location to the shipping staging location. Instead, the cable reel assembly 180 may be moved within the interior of the data center 40 using a pallet jack, for example. The pallet jack allows the cable reel assembly 180 to be moved in a safe and controlled manner within the interior of the data center 40. Furthermore, since the cable reel 72 was not removed or separated from the handling system 70, the need for specialized lifting equipment to place the cable reel 72 back onto a pallet, and the safety issues involved with the lifting of a heavy load to be at least slightly airborne is again completely avoided.

At the shipment staging location, the cable reel 72 may be more securely fixed to the handling system 70. For example, the cable reel 72 may be secured to the handling system 70 using at least one and preferably a plurality of reusable retention straps 192 (e.g., four retention straps 192), as shown in FIG. 4. To this end, the handling system 70 may include base anchors 194 (e.g., eyelets, hooks, loops or the like) affixed to the base body 94, such as at the top wall 104 of the transverse struts 100 adjacent their respective ends. The anchors 194 may be permanent or temporary (and removable) anchors. Additionally, the cable reel 72 may include similar reel anchors 196. In one embodiment, the reel anchors 196 may be permanently or temporarily connected to the support braces 81, such as along a spoke 84 thereof. The retention straps 192 may be connected to the base anchor 194 and the reel anchor 196 and tightened to secure the cable reel 72 to the handling device 70. When the retention straps 192 are not being used, the straps 192 may be stored in the storage cavity 130 in the base body 94. In this way, the retention straps 192 should not be separated from the handling device and the likelihood of losing or misplacing the retention straps 192 is significantly decreased.

After securing the cable reel 72 to the handling system 70 using the retention straps 192, for example, the cable reel assembly 180 may be moved to a shipping location in step 200. In step 202, upon the arrival of a LTL carrier vehicle at the installation site, the cable reel assembly 180 may be loaded onto the carrier truck for shipment back to the manufacturing facility. The movement of the cable reel assembly 180 in steps 200 and 202 may be by way of conventional pallet handling equipment maintained onsite. As can be appreciated, steps 200 and 202 are similar to the final steps in the conventional process 10 described above.

As can be seen from the above, the integrated, multi-functional system 70 for handling a fiber optic cable reel 72 at an installation site provides many advantages. For example, because of the palletized nature of the handling system 70, conventional pallet handling equipment may be used to move the cable reel around the installation site, from off-loading the cable reel 72 from a carrier or delivery truck, to installing fiber optic cable in sensitive areas of the installation site, to on-loading the cable reel 72 to a carrier or delivery truck. This addresses the multi modes of moving a cable reel in the conventional approach. This also addresses the use of specialized lifting equipment to remove the cable reel 72 from or position the cable reel 72 on a pallet. Moreover, because the handling system 70 performs the function of the pallet, the use of wood pallets in the cable reel transport process is avoided. This provides a more sustainable, environmentally friendly solution of pallet replacement. Additionally, because the handling system 70 includes a dispensing function, this system also addresses the use of specialized dispensing equipment to payoff lengths of fiber optic cable during installation. Furthermore, the handling system improves the safety of technicians and installers at the installation site.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A handling system for use with a fiber optic cable reel at an installation site, comprising:

a base body configured to support the fiber optic cable reel thereon, the base body including a connection interface for engaging with pallet handling equipment;

a first roller assembly connected to the base body and configured to engage with and vertically support the fiber optic cable reel when mounted on the base body; and a second roller assembly connected to the base body and configured to engage with and horizontally support the fiber optic reel when the fiber optic cable reel is supported on the base body, wherein the first roller assembly includes a plurality of first rollers to allow the fiber optic cable reel to rotate relative to the base body to payoff a length of fiber optic cable carried by the fiber optic cable reel for installation along a cable pathway at the installation site, wherein the second roller assembly includes a plurality of second rollers to guide the rotation of the fiber optic cable reel relative to the base body, wherein the second roller assembly includes a plurality of roller elements connected to the base body, and wherein each of the plurality of roller elements comprises:

a respective one of the plurality of second rollers; and a central axle about which the respective one of the plurality of second rollers rotates.

2. The handling system of claim 1, wherein the connection interface of the base body includes a plurality of engagement slots configured to engage with one or more tongs of the pallet handling equipment.

3. The handling system of claim 1, wherein the first roller assembly includes a plurality of roller blocks connected to the base body, and wherein each of the plurality of roller blocks comprises:

a roller housing; and a respective one of the plurality of first rollers disposed in the roller housing.

4. The handling system of claim 1, wherein each of the plurality of first rollers includes a central axle, and wherein the central axles of the plurality of first rollers are parallel to each other.

5. The handling system of claim 1, wherein the first roller assembly is adjustably connected to the base body to accommodate fiber optic cable reels of different sizes.

6. The handling system of claim 1, wherein the first roller assembly includes a brake to restrict the rotation of at least one of the plurality of first rollers relative to the base body.

7. The handling system of claim 1, wherein the central axles of the plurality of second rollers are parallel to each other.

8. The handling system of claim 1, wherein the second roller assembly is adjustably connected to the base body to accommodate fiber optic cable reels of different sizes.

9. The handling system of claim 1, wherein the base body is formed from steel, plastic, or combinations thereof.

10. The handling system of claim 1, further comprising a plurality of base anchors connected to the base body, the plurality of base anchors configured to facilitate securement of the cable reel to the base body.

11. The handling system of claim 1, wherein the base body includes a storage cavity for storing items related to the handling system.

12. A cable reel assembly, comprising:

a fiber optic cable reel; and a handling system on which the fiber optic cable reel is mounted, the handling system comprising:

a base body supporting the fiber optic cable reel thereon, the base body including a connection interface for engaging with pallet handling equipment;

a first roller assembly connected to the base body and engaged with and vertically supporting the fiber optic cable reel; and a second roller assembly connected to the base body and engaged with and horizontally supporting the fiber optic reel, wherein the first roller assembly includes a plurality of first rollers to allow the fiber optic cable reel to rotate relative to the base body to payoff a length of fiber optic cable carried by the fiber optic cable reel for installation along a cable pathway at the installation site wherein the second roller assembly includes a plurality of second rollers to guide the rotation of the fiber optic cable reel relative to the base body, wherein the second roller assembly includes a plurality of roller elements connected to the base body, and wherein each of the plurality of roller elements comprises:

a respective one of the plurality of second rollers; and a central axle about which the respective one of the plurality of second rollers rotates.

13. The cable reel assembly of claim 12, further comprising a plurality of reusable retention straps for selectively securing the fiber optic cable reel to the handling system.

14. A method of handling a fiber optic cable reel at an installation site, the fiber optic cable reel being part of a cable reel assembly comprising a handling system and the fiber optic cable reel mounted on the handling system, the method comprising:

moving the cable reel assembly to an installation location at the installation site using pallet handling equipment, the fiber optic cable reel having a supply of fiber optic cable thereon; and rotating the fiber optic cable reel relative to the handling system to payoff a length of fiber optic cable on the fiber optic cable reel for installation along a cable pathway at the installation site, wherein the handling system comprises:

a base body supporting the fiber optic cable reel thereon during the rotating, the base body including a connection interface for engaging with the pallet handling equipment;

a first roller assembly connected to the base body and engaged with and vertically supporting the fiber optic cable reel; and a second roller assembly connected to the base body and engaged with and horizontally supporting the fiber optic reel, wherein the first roller assembly includes a plurality of first rollers to allow the fiber optic cable reel to rotate relative to the base body to payoff the length of fiber optic cable carried by the fiber optic cable reel for installation along the cable pathway at the installation site, wherein the second roller assembly includes a plurality of second rollers to guide the rotation of the fiber optic cable reel relative to the base body, wherein the second roller assembly includes a plurality of roller elements connected to the base body, and wherein each of the plurality of roller elements comprises:

a respective one of the plurality of second rollers; and a central axle about which the respective one of the plurality of second rollers rotates.

15. The method of claim 14, wherein the handling system includes a connection interface configured as a plurality of engagement slots, and wherein moving the cable reel assembly using the pallet handling equipment includes engaging one or more tongs of the pallet handling equipment with respective one or more of the plurality of engagement slots on the handling system.

16. The method of claim 14, further comprising:

adjusting the first roller assembly to accommodate the size of the fiber optic cable reel being supported on the handling system, wherein the first roller assembly includes a brake to restrict the rotation of at least one of the plurality of first rollers; and engaging the brake during movements of the cable reel assembly about the installation site; and releasing the brake during rotations of the fiber optic cable reel relative to the handling system.

* * * * *